March 30, 1937.  J. M. BOWEN  2,075,698
SHAVING IMPLEMENT
Filed Aug. 12, 1936

INVENTOR
Joseph M. Bowen.
BY
ATTORNEY

Patented Mar. 30, 1937

2,075,698

UNITED STATES PATENT OFFICE 2,075,698

SHAVING IMPLEMENT

Joseph M. Bowen, West Quincy, Mass., assignor to Gillette Safety Razor Company, Boston, Mass., a corporation of Delaware Application August 12, 1936, Serial No. 95,588

9 Claims. (Cl. 30—43)

This invention relates to implements of the type employing co-operating shearing members and adapted for shaving, generally without the use of lather.

An object of the invention is to produce an implement of this type which shall be compact in structure, economical to manufacture with accuracy and effective in operation. With these ends in view an important feature of the invention consists in co-operating and relatively movable shearing members, one of which is mounted upon, or otherwise related to, a threaded support in such manner that when it is oscillated thereon it is caused by the thread to move back and forth and has therefore imparted thereto an oblique resultant movement which may be advantageously used for shearing.

Preferably and as herein shown the parts of the implement may be reduced to few in number. The support may take the form of a screw and one of the shearing members may comprise a cutter block threaded on the screw so that, when it is transversely oscillated, it is carried bodily forwardly or rearwardly a distance determined by the pitch of the thread. It is this combined reciprocatory and oscillatory movement upon which I rely for the shearing stroke of the cutter. This construction lends itself particularly well to an extremely compact arrangement of all parts of the implement in that a relatively small angular movement of the cutter block may be utilized to impart the full shearing stroke required and the range of movement permits a positive connection to be maintained between the cutter block and the prime mover at all times.

The implement herein illustrated has a rectangular frame in which the threaded support is mounted in movable bearings and these are maintained under spring pressure tending to maintain the co-operating shearing teeth of the two members always in yielding engagement. The bearings preferably take the form of blocks which are confined in their movement by the side walls of the casing and are held in spaced relation by the threaded member. The guard member may include a rectangular sleeve which fits telescopically with the frame and in which the stationary shearing teeth are formed. The oscillatory cutter block may be connected directly with the shaft of the operating motor and convenient access may be had to the interior of the implement for cleaning or replacement by merely removing the guard from the frame.

These and other features of the invention will be best understood and appreciated from the following description of a preferred embodiment thereof, selected for purposes of illustration and shown in the accompanying drawing, in which:—

Figure 1:
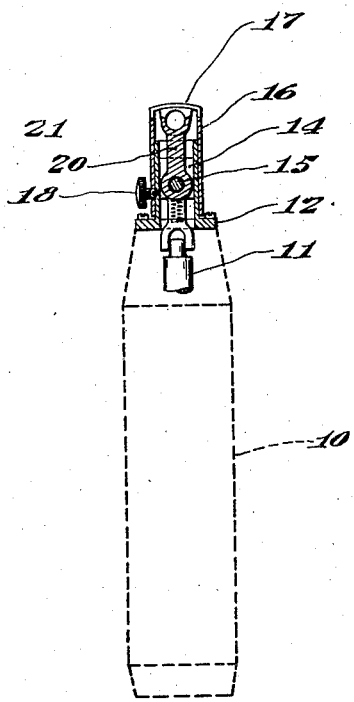
Fig. 1 is a view of the implement in cross-section, the housing being shown conventionally in dotted lines.
Figure 2:
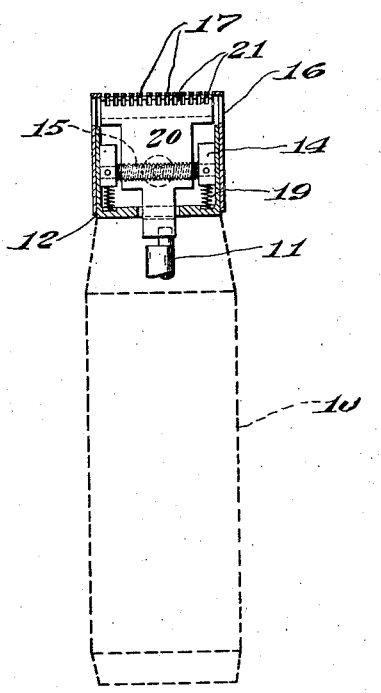
Fig. 2 is a similar view in longitudinal cross-section.
Figure 3:
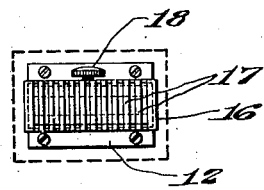
Fig. 3 is a plan view of the implement.

The housing 10 may be of any desired shape and material and may serve as a handle for the implement as well as a housing for the small motor which operates it. Secured to the upper end of the housing is a rectangular box frame 12 provided with flanges by which it may be rigidly secured to the housing 10. Vertically movable bearing blocks 14 are arranged to slide against the end walls of the frame 12, being confined in their movement by the side walls of the frame. These blocks are held apart and in engagement with end walls of the frame by a screw 15 which is pinned at each end to one of the blocks 14. The blocks 14 rest upon compression springs 19 and the cutter block 20 is mounted upon the screw 15 between the bearing blocks 14 with sufficient clearance so that it may rock freely and move longitudinally on the screw by reason of its threaded engagement therewith. The cutter block 20 has a T-shaped head in which are formed a longitudinal series of transversely disposed shearing teeth 21. It is also provided with a downwardly extending stem which is forked to engage an eccentric pin projecting from the upper end of the motor shaft 11.

The guard member 16 comprises a rectangular sleeve which is arranged to fit telescopically upon the frame 12 and to be held securely thereon by a clamping screw 18. The upper face of the guard 16 is curved upon a radius coinciding with the axis of the screw 15 when the parts of the implement are assembled in their shaving relation. It is also provided with a longitudinal series of transverse shearing teeth 17 corresponding to the shearing teeth 21 of the cutter block but slightly narrower. The face of the guard containing the shearing teeth 17 is smoothly curved and may be presented with comfort to the face of the user and moved across it so that the hairs may enter the space between the shearing teeth 17 of the guard and project into the spaces between the shearing teeth 21 of the cutter. When, now, the cutter block is rocked and moved endwise upon the screw 15 its shearing teeth move obliquely to the edge of the shearing teeth 17 of the guard, thus cleanly severing those hairs which have entered the teeth of the implement.

It will be noted that the head of the cutter block 20 is longitudinally perforated and that the shearing teeth 21 are cut through into the opening of this perforation. The frame casing 16 is also perforated in both of its end walls in alignment with the perforation of the cutter block with the result that all shaving debris may be easily removed from the implement as by merely blowing through it.

While the dimensions of the parts may be varied widely from the proportions shown, still within the scope of the appended claims, I have found satisfactory a spacing of .015 inch for the teeth 17 of the guard and a somewhat greater spacing to the teeth 21 of the cutter block. Under these circumstances the screw 15 may be of quadruple thread and the angle of cutter oscillation about 15°.

Having thus described my invention what I claim as new and desire to secure by Letters Patent of the United States is:—

1. An implement of the class described comprising a guard presenting transversely curved teeth, a screw located substantially at the center of curvature of said teeth, and a co-operating cutter arranged to oscillate upon the screw and being thereby reciprocated.

2. An implement of the class described comprising a curved guard presenting shearing teeth, a screw, a cutter supported upon the screw in yielding engagement with the teeth of the guard, and means for oscillating the cutter upon the screw and thereby causing it to reciprocate with reference to the guard.

3. An implement of the class described comprising a guard presenting transversely curved teeth, a screw located concentrically with respect to the teeth, a co-operating cutter arranged to oscillate upon the screw, and means acting through the screw to maintain the cutter in yielding engagement with the teeth of the guard.

4. An implement of the class described comprising a guard presenting transversely curved teeth, spaced bearings urged normally toward the guard, a screw mounted in said bearings, and a cutter block having co-operating teeth curved to fit the inner face of the guard, being mounted to oscillate on said screw and of such dimensions as to hold the screw substantially at the center of curvature of the guard teeth.

5. An implement of the class described comprising a screw carrying an oscillatory cutter block therein, a guard having teeth co-operating with the cutter block, means tending to move the screw and cutter block bodily toward the guard, and means for oscillating said cutter block and thereby causing it to travel longitudinally with respect to the guard.

6. An implement of the class described comprising a guard having a longitudinal series of transverse curved teeth, a longitudinally disposed screw carrying an oscillatory cutter block, and means for oscillating said block upon the screw thereby causing it to be moved longitudinally and to co-operate with the teeth of the guard in an oblique shearing cut.

7. An implement of the class described comprising a frame casing, a guard member having a sleeve to fit upon said casing and a series of curved shearing teeth, bearing blocks fitting between the walls of the casing, a screw mounted in said blocks and arranged to hold them apart and against the walls of the casing, and a shearing member mounted to oscillate upon said screw.

8. An implement of the class described comprising a rectangular casing having a pair of bearing blocks arranged to slide upon its end walls, a threaded member spacing said blocks, springs tending to elevate the bearing blocks, a cutter block mounted to oscillate upon the threaded member, and a guard arranged to co-operate with the cutter block and through it to hold the springs under compression.

9. An implement for dry shaving, comprising a frame, a guard having a curved face with teeth therein, means for detachably securing the guard to the frame, a screw mounted within the guard and yieldingly pressed toward the curved guard face, and an oscillatory cutter carried by said screw and having a curved face maintained at all times in engagement with the curved face of the guard.

JOSEPH M. BOWEN.